US008654208B2

(12) United States Patent
Origuchi (10) Patent No.: US 8,654,208 B2
(45) Date of Patent: Feb. 18, 2014

(54) IMAGING DEVICE AND IMAGING METHOD (75) Inventor: Yohta Origuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 12/690,172

(22) Filed: Jan. 20, 2010

(65) Prior Publication Data

US 2010/0188524 A1 Jul. 29, 2010

(30) Foreign Application Priority Data

Jan. 27, 2009 (JP) ................................ P2009-016010

(51) Int. Cl.
*H04N 9/43* (2006.01)
*H04N 5/228* (2006.01)
*H04N 9/73* (2006.01)

(52) U.S. Cl.
USPC ......................... 348/223.1; 348/222.1; 348/32

(58) Field of Classification Search
USPC ................................. 348/222.1–225.1, 32–35
See application file for complete search history.

(56) References Cited

U.S. PATENT DOCUMENTS

| 7,129,980 | B1* | 10/2006 | Ashida ...................... 348/333.04 |
| 7,773,259 | B2* | 8/2010 | Hsu et al. ........................ 358/1.9 |
| 8,089,551 | B2* | 1/2012 | Uehara et al. ............. 348/333.11 |
| 8,260,081 | B2* | 9/2012 | Takagi ............................ 382/275 |
| 2007/0291152 | A1* | 12/2007 | Suekane et al. ........... 348/333.02 |
| 2008/0013135 | A1* | 1/2008 | Hsu et al. ........................ 358/520 |
| 2008/0107355 | A1* | 5/2008 | Onuki ............................. 382/284 |
| 2008/0279427 | A1* | 11/2008 | Takagi ............................ 382/118 |
| 2009/0040329 | A1* | 2/2009 | Uehara et al. ................ 348/222.1 |
| 2009/0303336 | A1* | 12/2009 | Utsugi ........................ 348/222.1 |
| 2009/0316016 | A1* | 12/2009 | Iwamoto .................... 348/222.1 |

FOREIGN PATENT DOCUMENTS

| JP | 6 225328 | 8/1994 |
| JP | 2000 69490 | 3/2000 |
| JP | 2004 192129 | 7/2004 |
| JP | 2006 209209 | 8/2006 |
| WO | WO 2007 109632 | 9/2007 |

* cited by examiner

*Primary Examiner* — Timothy J Henn
*Assistant Examiner* — Pritham Prabhakher
(74) *Attorney, Agent, or Firm* — Frommer Lawrence & Haug LLP; William S. Frommer; Ellen Marcie Emas (57) ABSTRACT An imaging device is provided which includes a hue value setting portion that sets at least one hue value from among a plurality of hue values, a color component region detection portion that detects a region having a color component that includes the set hue value, from image data of a photographic subject, and a color component region display portion that, based on the image data of the photographic subject, converts, of the photographic subject, the detected region having the color component to a first color, converts regions other than the detected region having the color component to a second color different from the first color, and displays the photographic subject on a display portion.

9 Claims, 12 Drawing Sheets

IMAGING DEVICE AND IMAGING METHOD

BACKGROUND OF THE INVENTION

1. Field of the Invention

The present invention relates to an imaging device and an imaging method.

2. Description of the Related Art

Some imaging devices, such as digital still cameras and video cameras etc., have an auto exposure (AE) function in which exposure is controlled based on the amount of light received. With this function, the imaging device can adjust the brightness of the photographic subject. In this case, the brightness of the photographic subject changes depending on whether the brightness is adjusted while taking the whole photographic subject as a point of reference or adjusted while taking part of the photographic subject as the point of reference (such as a face of a human subject, for example). For example, when the brightness is adjusted while taking the whole photographic subject as the point of reference, if there is a high luminance light source, such as lighting or a window, around a human subject, the human subject becomes dark, and it is difficult for a photographer to adjust to an expected appropriate brightness.

Here, in order to control exposure when photographing a human subject, it is conceivable to use, for example, face recognition technology. However, known face recognition technology is based on edge information of an image, resulting in a high computational load. Thus, circuit size tends to increase.

On the other hand, technology exists in which attention is focused on the color of the photographic subject, and exposure is controlled by targeting a photographic subject that has a specific color. Technology is disclosed, for example, in Japanese Patent Application Publication No. JP-A-2004-192129, in which a light source is determined and skin color conditions are set, and then regions are detected from the image that have a hue of the skin color. Then, based on the detected regions, brightness correction and white balance correction etc. are performed such that the face of the human subject is reproduced with the appropriate brightness and color. In addition, technology is disclosed, for example, in Japanese Patent Application Publication No. JP-A-2000-69490, in which color components in an optical image are detected and an appropriate exposure value is calculated from the detected color components.

SUMMARY OF THE INVENTION

However, when exposure control is performed by targeting a photographic subject that has a specific color, it is not discussed how to select the color of the photographic subject on which the user's attention is focused. Therefore, it is difficult to realize exposure control in which attention is focused on the color of the photographic subject.

Further, in order to select a specific color from among a plurality of colors and to rapidly realize exposure control in which the photographic subject having the specific color is targeted, it is conceivable that, for example, a graphic user interface (GUI) is supplied to the user. However, appropriate GUI has not previously been discussed, and it is therefore difficult to match the color expected by the user with the actual color of the photographic subject. As a result, it is not possible to rapidly realize exposure control in which the photographic subject having the color desired by the user is targeted.

In light of the foregoing, it is desirable to provide a novel and improved imaging device and imaging method that are capable of clearly showing a set color and capable of rapidly performing adjustment of exposure control when exposure control is performed based on color detection.

According to an embodiment of the present invention, there is provided an imaging device including a hue value setting portion that sets at least one hue value from among a plurality of hue values, a color component region detection portion that detects a region having a color component that includes the set hue value, from image data of a photographic subject, and a color component region display portion that, based on the image data of the photographic subject, converts, of the photographic subject, the detected region having the color component to a first color, converts regions other than the detected region having the color component to a second color different from the first color, and displays the photographic subject on a display portion.

The color component that includes the set hue value may be a group of colors within a predetermined range centered on the hue value.

The hue value setting portion may set at least two hue values, the color component region detection portion may detect, for each of the set hue values, the region having the color component that includes the set hue value, from the image data of the photographic subject, and based on the image data of the photographic subject, the color component region display portion may convert, of the photographic subject, a region having one of the detected plurality of color components to the first color, convert regions other than the region having one of the detected plurality of color components to the second color different from the first color, and display the photographic subject on the display portion.

The hue value setting portion may set at least two hue values, the color component region detection portion may detect, for each of the set hue values, the region having the color component that includes the set hue value, from the image data of the photographic subject, and based on the image data of the photographic subject, the color component region display portion may convert, of the photographic subject, a region that satisfies all of the detected plurality of color components to the first color, convert regions other than the region that satisfies all of the detected plurality of color components to the second color different from the first color, and display the photographic subject on the display portion.

The imaging device may further include an operation portion from which a user inputs a hue value. The hue value setting portion may set the at least one hue value based on the hue value input from the operation portion.

The imaging device may further include an operation portion from which a user inputs the predetermined range. The hue value setting portion may detect, from the image data of the photographic subject, a region having a color component based on the predetermined range input from the operation portion.

According to another embodiment of the present invention, there is provided an imaging method including the steps of setting at least one hue value from among a plurality of hue values, detecting a region having a color component that includes the set hue value, from image data of a photographic subject, and based on the image data of the photographic subject, converting, of the photographic subject, the detected region having the color component to a first color, converting regions other than the detected region having the color component to a second color different from the first color, and displaying the photographic subject on a display portion.

According to the embodiments of the present invention described above, it is possible to clearly show a set color and to rapidly perform adjustment of exposure control when exposure control is performed based on color detection.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in detail in the following order.

1. Structure of imaging device 100 according to an embodiment

2. Operation of imaging device 100 according to the embodiment

1. Structure of Imaging Device 100 According to an Embodiment

Figure 1:
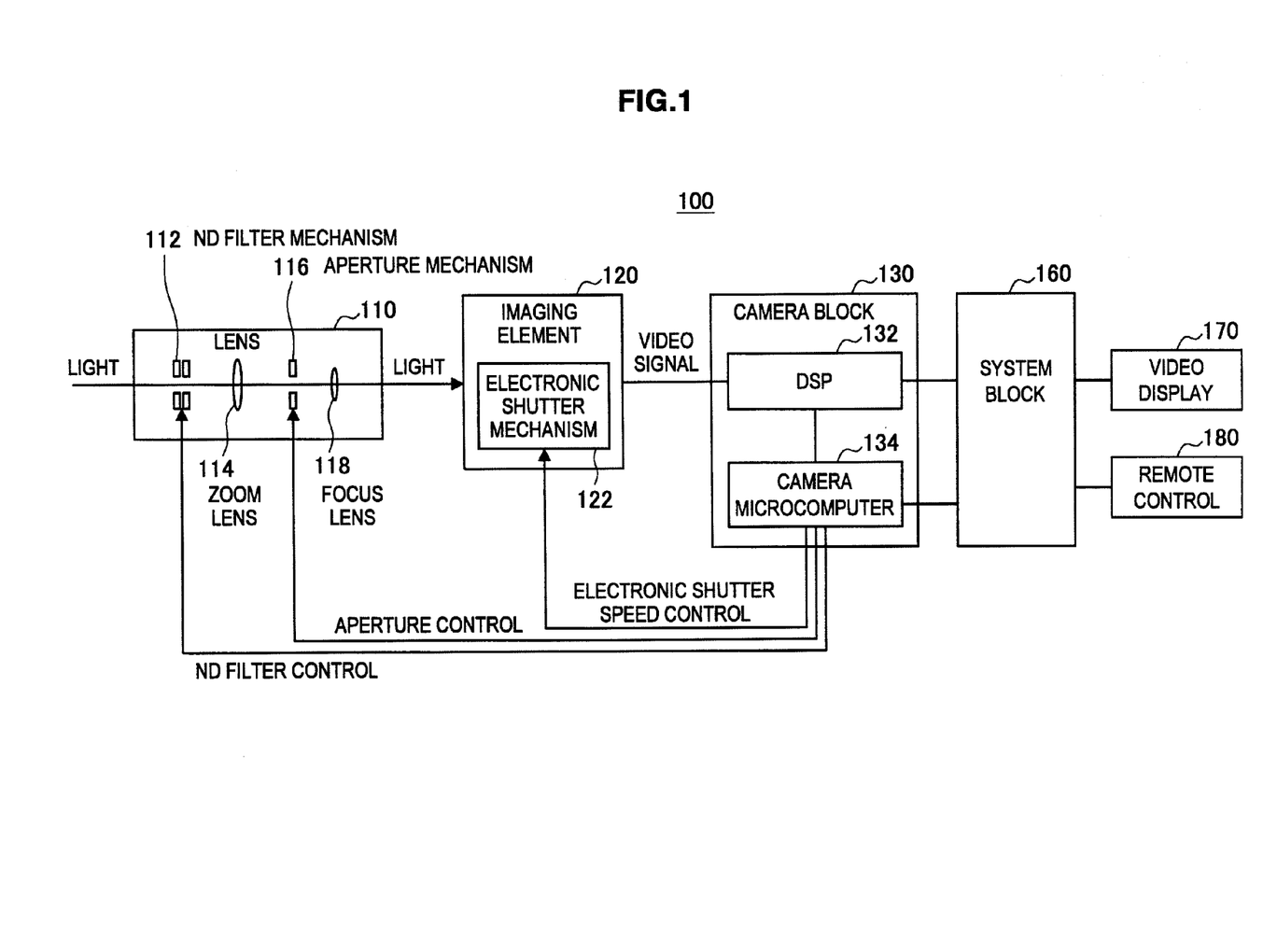
FIG. 1 is a block diagram showing an imaging device 100 according to an embodiment of the present invention.
Figure 2:
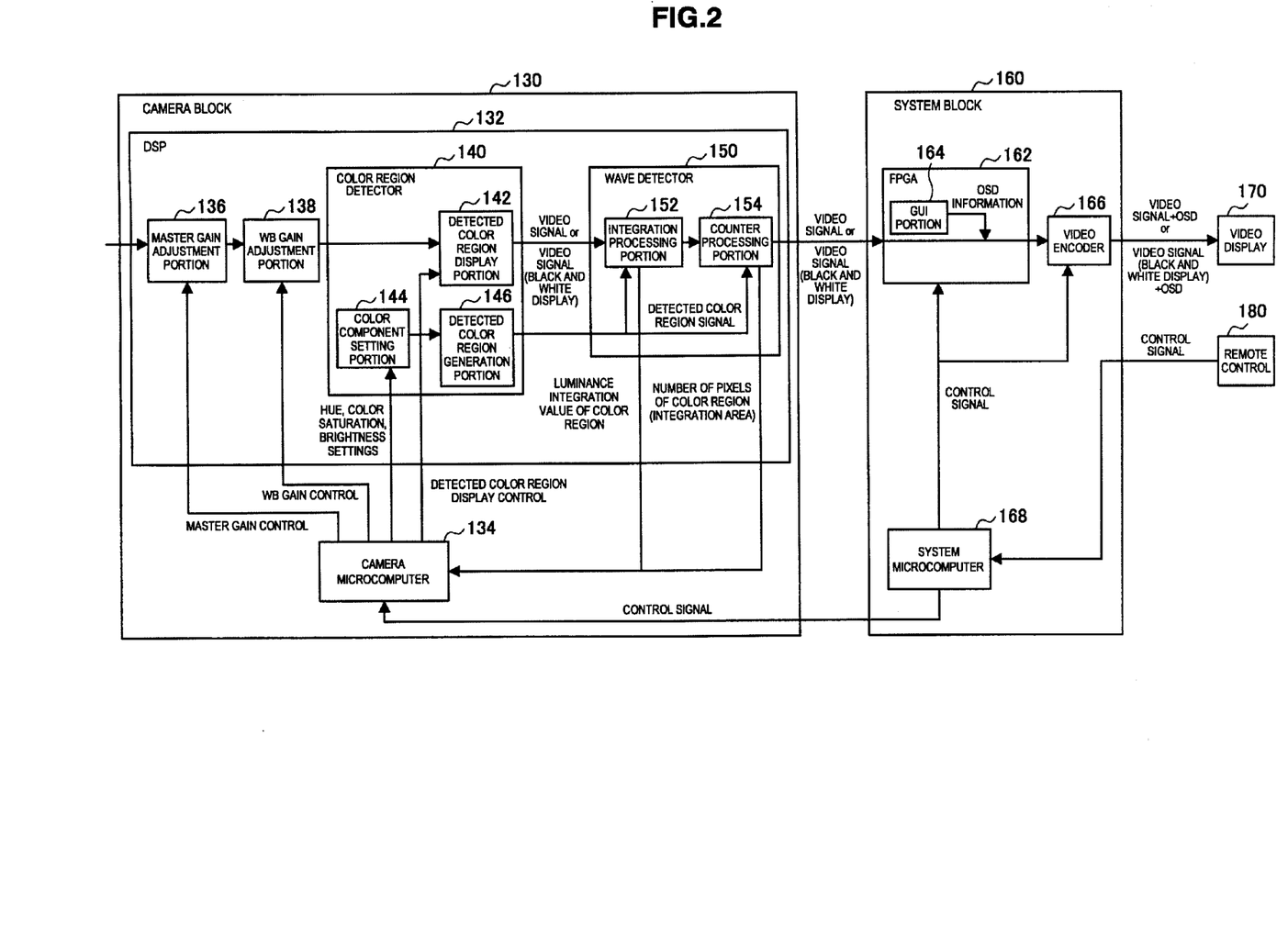
FIG. 2 is a block diagram showing a camera block and a system block according to the embodiment.

First, the structure of an imaging device 100 according to an embodiment of the present invention will be explained with reference to FIG. 1. FIG. 1 is a block diagram showing the imaging device 100 according to the present embodiment. FIG. 2 is a block diagram showing a camera block 130 and a system block 160 according to the present embodiment. The imaging device 100 according to the present embodiment is, for example, a digital still camera or a digital video camera, and can record a photographic subject as digital data.

The imaging device 100 includes, for example, a lens 110, an imaging element 120, the camera block 130, the system block 160, a video display 170 and a remote control 180.

The lens 110 allows light from the photographic subject to pass through and causes an image of the photographic subject to be formed on the imaging element 120. The lens 110 includes, for example, an ND filter mechanism 112, a zoom lens 114, an aperture mechanism 116 and a focus lens 118.

The ND filter mechanism 112 is arranged, for example, closer to the photographic subject than the zoom lens 114. The ND filter mechanism 112 reduces the amount of light entering into the lens 110. The ND filter mechanism 112 receives control signals from a camera microcomputer 134 and changes the position of an ND filter.

The zoom lens 114 changes a focal length of the lens 110 and zooms into or zooms out from the photographic subject. The aperture mechanism 116 blocks light from the photographic subject and adjusts the amount of light that reaches the imaging element 120. The aperture mechanism 116 receives control signals from the camera microcomputer 134 and changes an aperture radius. The focus lens 118 focuses the photographic subject onto the imaging element 120.

The imaging element 120 is a solid-state imaging element, such as a charge coupled device (CCD) or a complementary metal oxide semiconductor (CMOS) imaging element, and converts light entering through the lens 110 from the photographic subject into electrical signals. In addition, the imaging element 120 has an electronic shutter mechanism 122. The electronic shutter mechanism 122 receives control signals from the camera microcomputer 134 and changes the shutter speed.

The camera block 130 includes, for example, a digital signal processor (DSP) 132 and the camera microcomputer 134. The camera microcomputer 134 is, for example, a CPU, and performs overall control of the DSP 132 and the imaging device 100 as a whole by executing programs stored in a memory. Furthermore, the camera microcomputer 134 performs various computing processes to perform that control.

The DSP 132 includes, for example, a master gain adjustment portion 136, a WB gain adjustment portion 138, a color region detector 140 and a detector 150. The master gain adjustment portion 136 acquires a master gain value that is calculated by the camera microcomputer 134, based on the amount of exposure. The master gain adjustment portion 136 adjusts the brightness of the photographic subject etc., based on the master gain value. The WB gain adjustment portion 138 acquires a WB gain value that is calculated by the camera microcomputer 134, based on color components of image data. The WB gain adjustment portion 138 adjusts the image data, based on the WB gain value.

The color region detector 140 includes a detected color region display portion 142, a color component setting portion 144 and a detected color region generation portion 146. To clearly define a region that has the same or a similar color component to a color component that has been set, the detected color region display portion 142 generates video signals such that a detected color region can be displayed on a screen. The detected color region display portion 142 is one example of a color component region display portion, and converts the color of the regions other than the region that has the detected color component to a second color that differs from a first color, and displays the photographic subject on a display portion. The color component setting portion 144 sets a color component that exists in the photographic subject that is targeted for detection by a user. The color component includes, for example, color palette values, color saturation values, brightness values and the respective ranges of each. The color component setting portion 144 is one example of a hue value setting portion. The detected color region generation portion 146 is one example of a color component region detection portion, and detects, from the image data, a section that has the same or a similar color component to the set color component. The detected color region generation portion 146 generates the detected section as a detected color region signal, and outputs the signal to an integration processing portion 152 and a counter processing portion 154 of the detector 150.

The detector 150 includes the integration processing portion 152 and the counter processing portion 154. The detector 150 performs detection, for example, for auto exposure (AE). The integration processing portion 152 is one example of a luminance calculation portion, and calculates a luminance integration value of the detected color region, based on the luminance value of the detected color region signal. The integration processing portion 152 outputs the calculated luminance integration value to the camera microcomputer 134. The counter processing portion 154 is one example of an area calculation portion, and counts a number of pixels in the detected color region, based on the detected color region signal. The integration area of the detected color region is calculated in this way. The counter processing portion 154 outputs the calculated integration area to the camera microcomputer 134.

The system block 160 includes a field programmable gate array (FPGA) 162, a video encoder 166, and a system microcomputer 168. The FPGA 162 includes a GUI portion 164. The GUI portion 164 generates onscreen display (OSD) information.

The video encoder 166 generates video signals for monitor display, based on the image data, and outputs the video signals to the video display 170. The system microcomputer 168 is, for example, a CPU, and performs overall control of the system block 160 as a whole by executing programs stored in a memory. Furthermore, the system microcomputer 168 performs various computing processes to perform that control.

The video display 170 is, for example, a liquid crystal display or an organic EL display that is provided in the imaging device 100. The video display 170 displays video obtained from video signals. The video display 170 does not only display the photographic subject, but also displays, for example, a menu screen or displays the detected color region and so on.

The remote control 180 is operated by the user, and generates control signals corresponding to content of the operation. The remote control 180 outputs the generated control signals to the system microcomputer 168.

2. Operation of Imaging Device 100 According to the Embodiment

Figure 3:
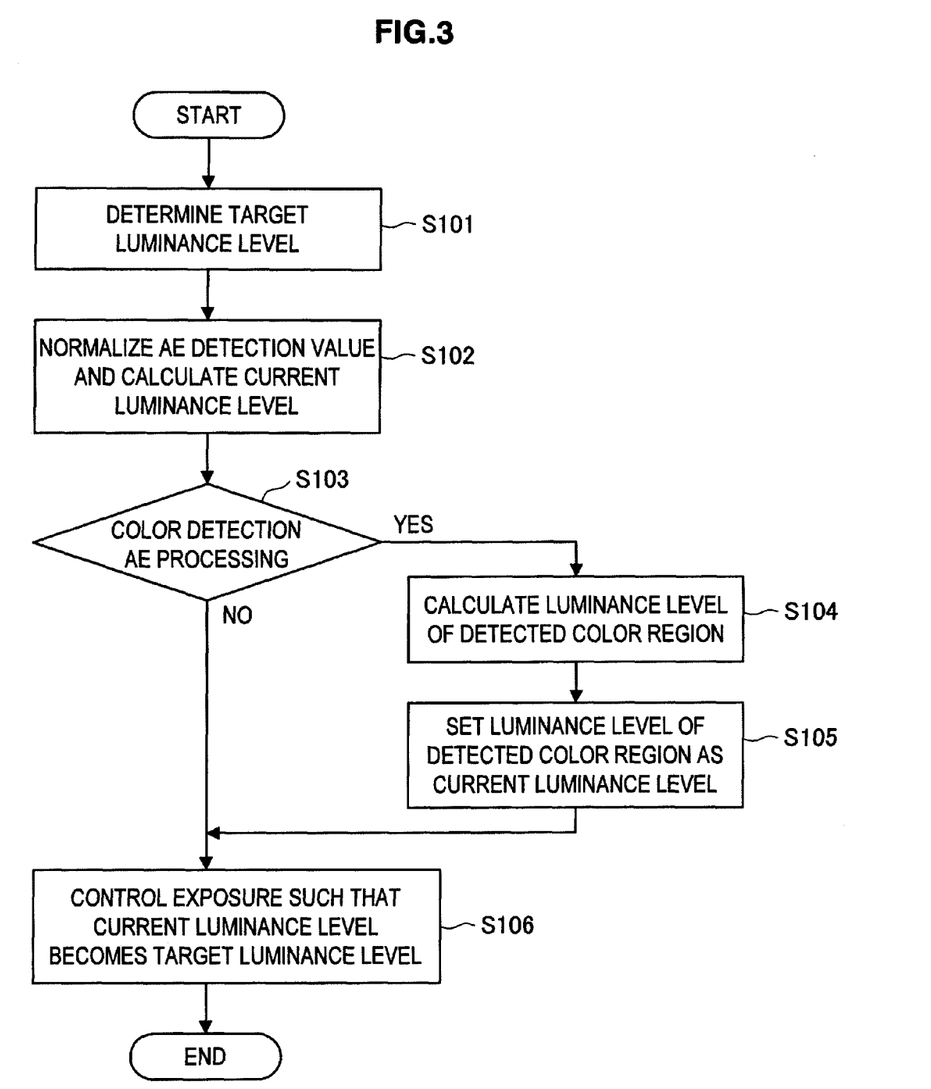
FIG. 3 is a flow chart showing an AE processing operation of the imaging device 100 according to the present embodiment.

Next, an AE processing operation of the imaging device 100 according to the present embodiment will be explained with reference to FIG. 3. FIG. 3 is a flow chart showing an AE processing operation of the imaging device 100 according to the present embodiment.

When photographing the photographic subject, auto exposure (AE) of the imaging device 100 is performed in order to obtain an appropriate brightness of the photographic subject. First, in the imaging device 100, a target luminance level is decided (step S101). A value of the target luminance level varies depending on how bright the target photographic subject is to be made. The target luminance level may be constant, or may be decided in accordance with the scene being photographed. The scene being photographed may be selected by the user, or may be determined from obtained image data.

Next, a luminance value is obtained from image data, and an AE detection value is calculated based on the obtained luminance value. The AE detection value is calculated while taking the luminance of the whole photographic subject as a point of reference. At this time, the calculated AE detection value of the whole photographic subject is normalized, and is first calculated as the current luminance level (step S102). Here, normalization of the AE detection value means calculation of a luminance level that is not dependent on a detection area. In other words, normalization is a process by which an integration value obtained by adding up luminance for each pixel is divided by the number of integrated pixels, and luminance levels can be equally compared regardless of the detection area and the number of integrated pixels. In a different AE operation mode, i.e. in a mode in which a spotlight is searched for and auto exposure is performed, the AE detection value is obtained from an area that is one ninth of the normal detection area. In a color detection AE process that will be explained later, the AE detection value is obtained in a color region area. Further, when a video signal format is different, for example, in a 1920×1080 mode and a 1280×720 mode, even though the detection area on the monitor appears to be the same, the number of integrated pixels from which the AE detection value can be obtained differs. By normalizing the AE detection value in this way, regardless of differences in the detection area due to the AE operation mode or of differences in the video signal format, the AE value can be handled in the same way.

After that, the color detection AE process is performed. First, it is determined whether or not the color detection AE process is performed (step S103). When the color detection AE process is not performed, exposure control is performed such that the luminance level of the whole photographic subject becomes the current luminance level, and the current luminance level of the whole photographic subject becomes the target luminance level (step S106).

In the color detection AE process, a region having a specific color component is detected from the image data, and a luminance level of the detected color region is calculated (step S104). Then, the calculated luminance level of the detected color region is set as the current luminance level (step S105). Here, the specific color component is a color component of the target photographic subject. For example, when a face is being detected, the color component is skin color etc.

After that, exposure control is performed such that the current luminance level of the detected color region becomes the target luminance level (step S106). In exposure control, for the luminance level to become the calculated target luminance level, gain, an aperture opening value and shutter speed, for example, are adjusted.

Through the above-described operation, the AE processing operation is performed based on the image data of the photographic subject. In addition, in the present embodiment, the color detection AE process is performed with reference to a region that has a specific color component.

Figure 4:
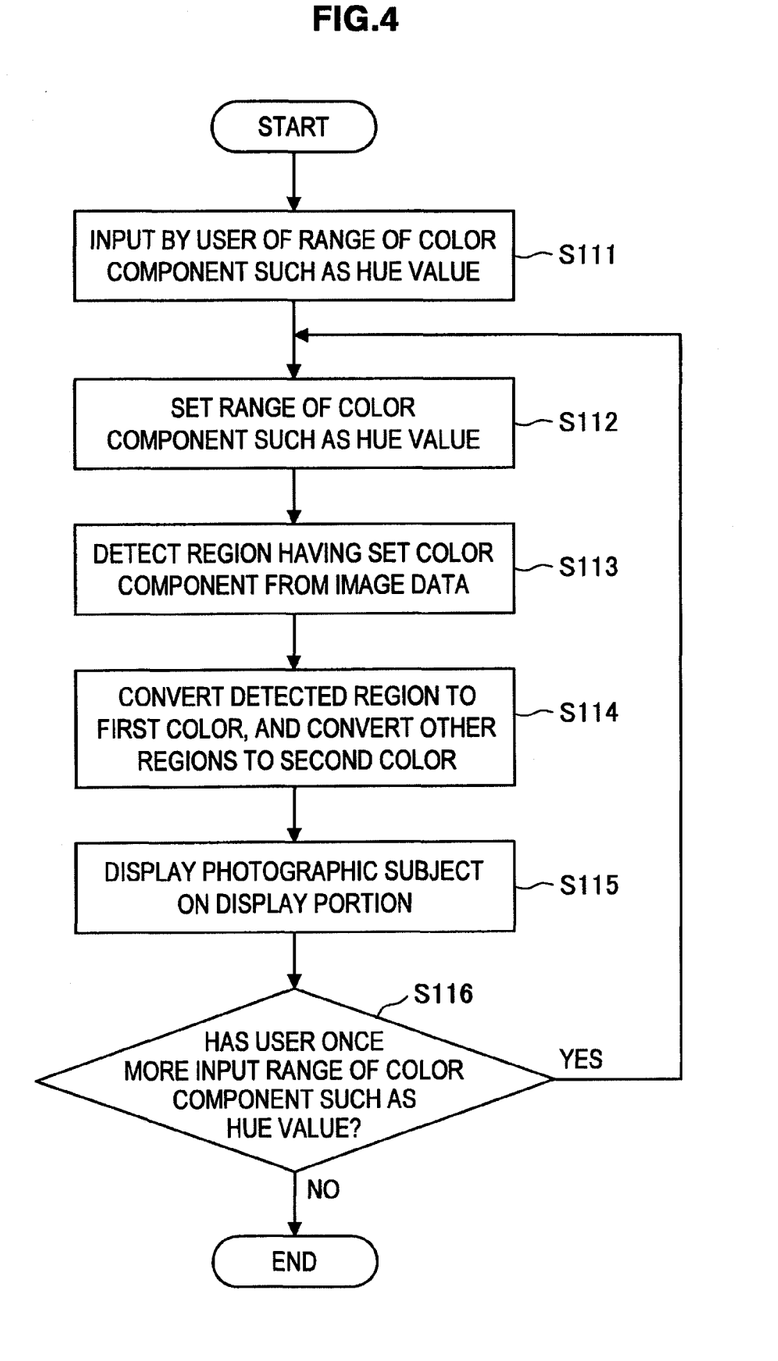
FIG. 4 is a flow chart showing a color selection processing operation in a color detection AE process of the imaging device 100 according to the present embodiment.

Next, a color selection processing operation in the color detection AE process of the imaging device 100 according to the present embodiment will be explained with reference to FIG. 4. FIG. 4 is a flow chart showing the color selection processing operation in the color detection AE process of the imaging device 100 according to the present embodiment.

Figure 5:
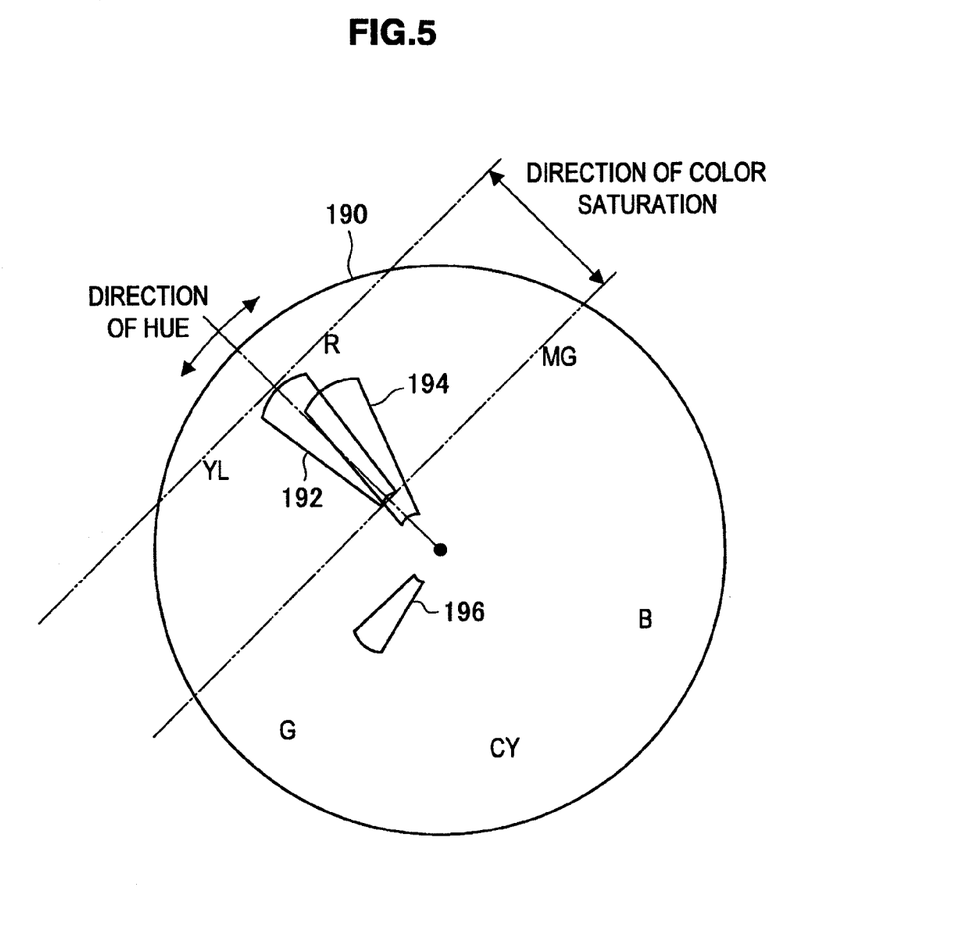
FIG. 5 is an explanatory diagram showing a hue/color saturation chart 190 for a given luminance.

First, the user inputs the hue value, the color saturation value and the luminance value of the photographic subject that the user wants to detect (step S111). For example, an input method is used in which a hue/color saturation chart 190 shown in FIG. 5 is displayed on the screen of the video display 170 so that the user can select, from the hue/color saturation chart 190, the ranges of the hue value and the color saturation value that the user wants to detect. In this case, it should be ensured that the luminance of the hue/color saturation chart 190 can be adjusted. FIG. 5 shows an example of a color component 192 that has been set. FIG. 5 is an explanatory diagram showing the hue/color saturation chart 190 for a given luminance. The color component 192 is defined by hue, color saturation and luminance values. A given color component is displayed, for example, as the color component 192 shown in the hue/color saturation chart 190. Thus, the user can roughly assess the color from the hue/color saturation chart 190, and the user therefore can quickly select the color.

In addition, as the input method of the hue value, the color saturation value and the luminance value, it is also acceptable that the hue value, the color saturation value and the luminance value are directly input via the remote control 180 or a keyboard of a personal computer that is externally connected.

When the user inputs the hue value, the color saturation value, the luminance value, and the ranges of these values, a range of the color component that is expressed by the hue value, the color saturation value and the luminance value of the target to be detected is set for the imaging device 100 (step S112).

Then, the color region having a color component that is the same as or similar to the color component such as the set hue value etc. is detected from the image data (step S113). For example, when the face of a human subject is targeted, the color component of skin color is set. Then, the region having a color component that is the same as or similar to the skin color is detected from the image data.

Next, a case will be described in which the display is shifted to a display to confirm whether or not a color component that is the same as or similar to the color set by the user is included in the photographic subject. This display may be called a check mode. When the display is shifted to the check mode, the imaging device 100 converts the color region detected at step S113 to the first color, and converts the color regions other than the detected color region to the second color (step S114). Then, based on the converted colors, the photographic subject is displayed on the screen of the video display 170 (the display portion) (step S115).

Figure 6:
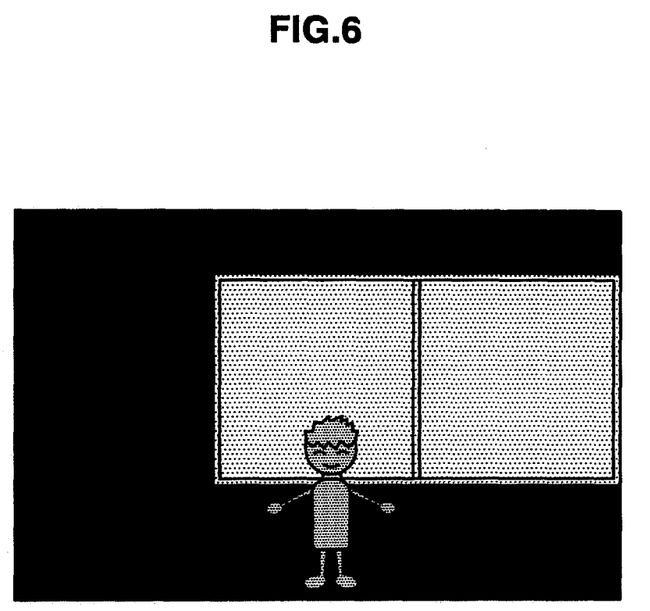
FIG. 6 is an explanatory diagram showing a photographic subject.
Figure 7A:
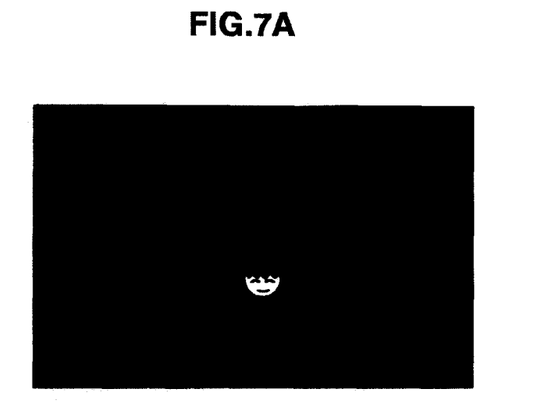
FIG. 7 is an explanatory diagram showing a photographic subject.
Figure 7B:
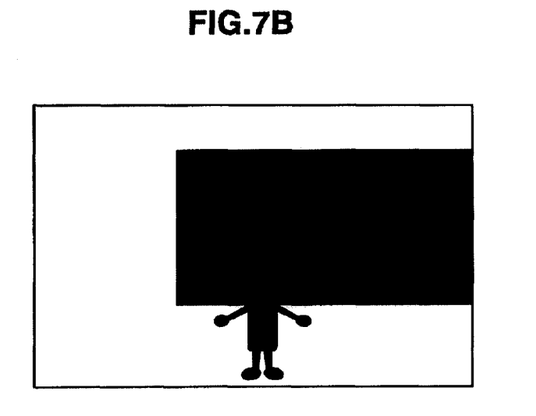
Figure 7C:
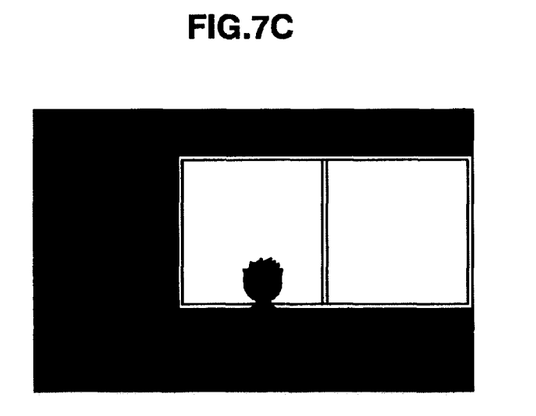

For example, when the photographic subject shown in FIG. 6 is obtained, let us assume that a color component that is the same as or similar to the color component of the face of the human subject is set. In this case, the face of the human subject is detected at step S113. FIG. 6 is an explanatory diagram showing the photographic subject. Then, at step S114, if the color region detected at step S113 is converted to white and the color regions other than the detected color region are converted to black, the face section is converted to white as shown in (A) in FIG. 7, and the sections other than the face section are converted to black. In this way, the photographic subject is displayed on the screen of the video display 170.

Next, it is determined whether or not the user has once more input the hue value, the color saturation value and the luminance value of the photographic subject that the user wants to detect (step S116). When it is determined that the user has input these values once more, the process returns to step S112, and a color region that has the newly set color component is detected (step S113). Then, the newly detected color region is converted to white, the other color regions are converted to black (step S114), and the photographic subject is displayed on the screen of the video display 170 (step S115).

For example, let us assume that, of the photographic subject shown in FIG. 6, a color component that is the same as or similar to the wall behind the human subject is newly input and set. In this case, as shown in (B) in FIG. 7, the wall section is converted to white, and the sections other than the wall section are converted to black. Further, let us assume that, of the photographic subject shown in FIG. 6, a color component that is the same as or similar to the window behind the human subject is newly input and set. In this case, as shown in (C) in FIG. 7, the window section is converted to white, and the sections other than the window section are converted to black.

As described above, according to the present embodiment, the same color as the color set by the user is displayed in white, for example, and the other sections are displayed in black. Therefore, the color set for the color detection AE can be rapidly confirmed.

First Working Example

Next, a case will be described in which two or more color components can be set in the setting of the color components, such as the hue value etc.

Figure 8A:
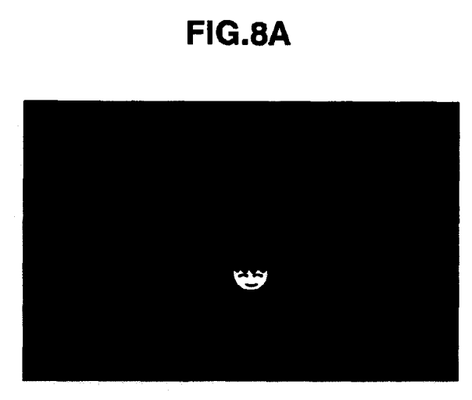
FIG. 8 is an explanatory diagram showing a photographic subject
Figure 8B:
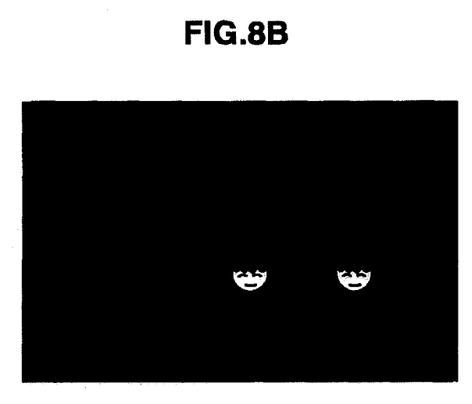
Figure 8C:
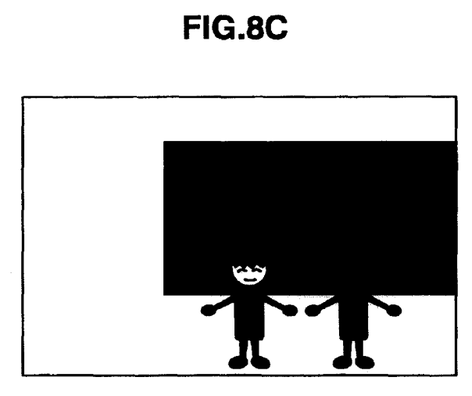

When two color components (a color component A and a color component B) are set, if a color region that is the same as or similar to one color component (the color component A) among the two color components is detected by the above-described check mode, there are cases in which (A) in FIG. 8 is displayed. The image (A) in FIG. 8 is displayed when the color component A is the same as or similar to the color of the face of the human subject.

Then, while the range of the one color component (the color component A) is fixed, the range of the other color component (the color component B) is varied. In this case, if color regions that are respectively the same as or similar to the two color components (the color component A and the color component B) are detected by the above-described check mode, (B) in FIG. 8 is displayed. The image (B) in FIG. 8 is displayed when the color component A is the same as or similar to the color of the face of the human subject, and the color component B is the same as or similar to the color of the face of the human subject.

Further, while the range of the one color component (the color component A) is fixed, the range of the other color component (the color component B) is varied. In this case, if color regions that are respectively the same as or similar to the two color components (the color component A and the color component B) are detected by the above-described check mode, (C) in FIG. 8 is displayed. The image (C) in FIG. 8 is displayed when the color component A is the same as or similar to the color of the face of the human subject, and the color component B is the same as or similar to the color of the wall.

Second Working Example

Next, when two or more color components can be set in the setting of the color components, such as the hue value etc., a case in which respective color components are detected using an OR condition, and a case in which respective color components are detected using an AND condition will be described.

Figure 9A:
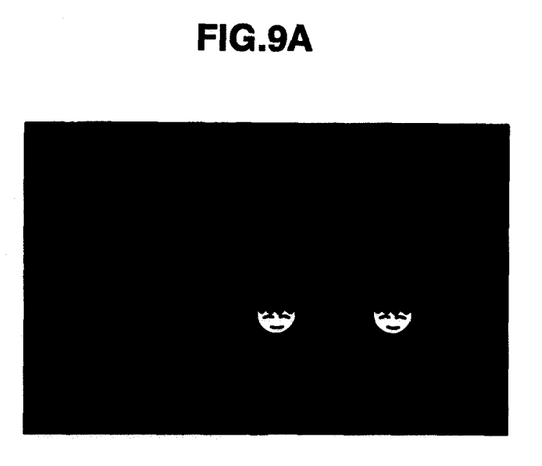
FIG. 9 is an explanatory diagram showing a photographic subject.
Figure 9B:
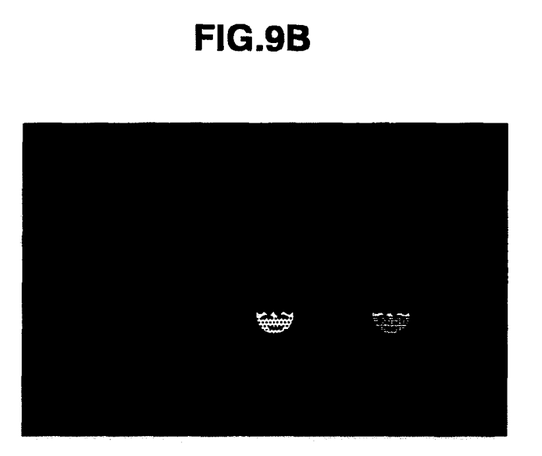

For example, in the hue/color saturation chart 190 shown in FIG. 5, if the color component A is the color component 192 and the color component B is the color component 194, a color region that is the same as or similar to one of the color component 192 and the color component 194 is detected by using the OR condition. Therefore, when the two color components (the color component A and the color component B) are set, using the OR condition, (A) in FIG. 9 is displayed in the above-described check mode. The image (A) in FIG. 9 is displayed when the color component A is the same as or similar to the color of the face of the human subject, and the color component B is the same as or similar to the color of the face of the human subject.

On the other hand, for example, in the hue/color saturation chart 190 shown in FIG. 5, if the color component A is the color component 192 and the color component B is the color component 194, a color region that is the same as or similar to a section that satisfies both the color component 192 and the color component 194 is detected by using the AND condition. In other words, only the color component of the section in which the color component 192 and the color component 194 overlap with each other is detected. Therefore, when the two color components (the color component A and the color component B) are set, using the AND condition, (B) in FIG. 9 is displayed in the above-described check mode. In this case, the range of the color components serving as the detection target is narrow. As a result, the entire face of the human subject is not displayed in white, and sections of the face of the human subject in which the color components do not coincide are displayed in black.

Figure 10A:
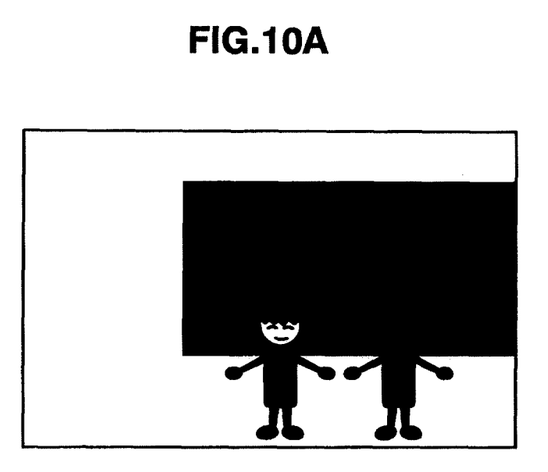
FIG. 10 is an explanatory diagram showing a photographic subject.
Figure 10B:
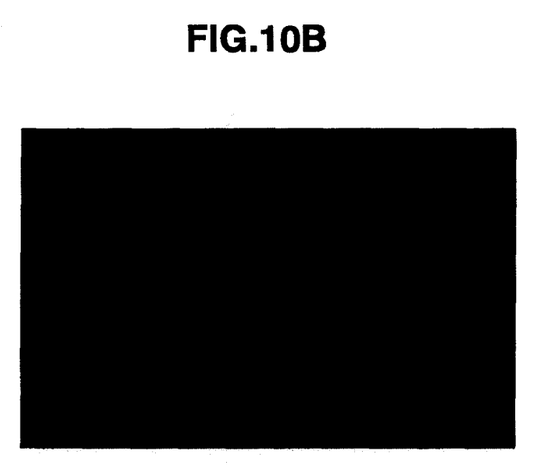

Further, for example, in the hue/color saturation chart 190 shown in FIG. 5, if the color component A is the color component 192 and the color component B is the color component 196, a color region that is the same as or similar to one of the color component 192 and the color component 196 is detected by using the OR condition. Therefore, when the two color components (the color component A and the color component B) are set, using the OR condition, (A) in FIG. 10 is displayed in the above-described check mode. The image (A) in FIG. 10 is displayed when the color component A is the same as or similar to the color of the face of the human subject, and the color component B is the same as or similar to the color of the wall.

Moreover, for example, in the hue/color saturation chart 190 shown in FIG. 5, if the color component A is the color component 192 and the color component B is the color component 196, a color region that is the same as or similar to a section that satisfies both the color component 192 and the color component 196 is detected by the AND condition. However, there is no section in which the color component 192 and the color component 196 overlap with each other. Therefore, when the two color components (the color component A and the color component B) are set, using the AND condition, (B) in FIG. 10 is displayed in the above-described check mode. That is, no color region is detected and the display is all black.

Third Working Example

Next, a case will be described in which two or more color components can be set in the setting of the color components, such as the hue value etc., and the range of each of the color components can be varied.

Figure 11:
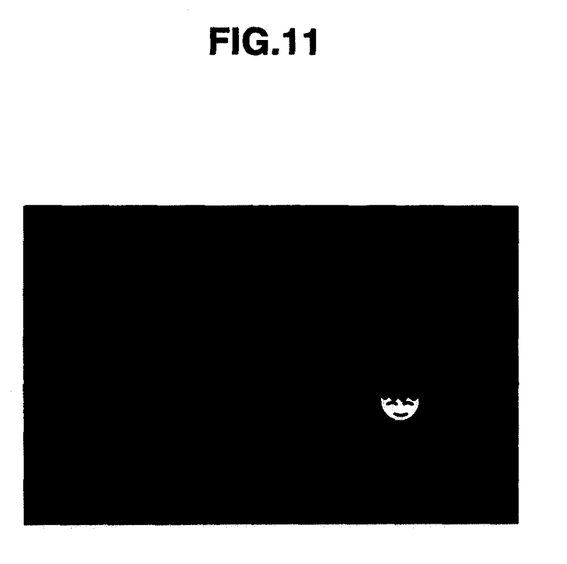
FIG. 11 is an explanatory diagram showing a photographic subject.

With reference to FIG. 11, let us assume a case in which the color component A is set to be the same as or similar to the color of the face of one of the human subjects and the color component B is set to be the same as or similar to the color of the face of the other human subject. However, when the range of the color component A is narrowed, the color of the face of the one of the human subjects is not detected. Consequently, as shown in FIG. 11, the color of the face of the one of the human subjects is not displayed in white in the check mode.

Figure 12A:
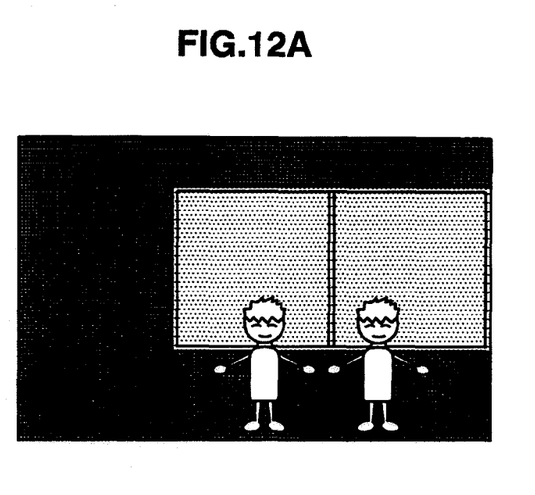
FIG. 12 is an explanatory diagram showing a photographic subject.
Figure 12B:
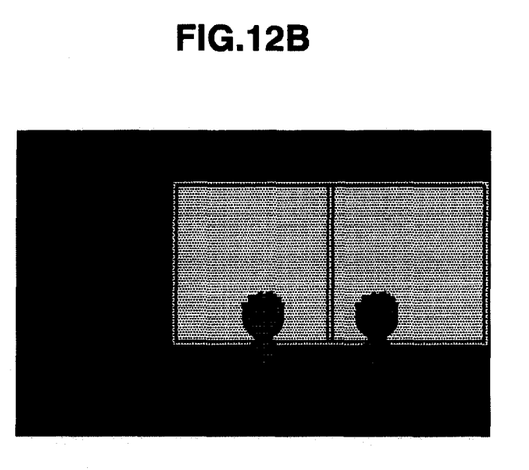

When the ranges of the color component A and the color component B are appropriate and the colors of the faces of the two human subjects are detected, (B) in FIG. 8 is displayed in the check mode. Then, as a result of being subjected to exposure control, the two human subjects are displayed with appropriate brightness as shown in (A) in FIG. 12. On the other hand, when the colors of the faces of the two human subjects are not detected as a result of narrowing the ranges of the color component A and the color component B, the entire screen is displayed in black in the check mode. Then, exposure control is performed to darken the whole photographic subject because the window behind the human subjects has a high luminance as shown in (B) in FIG. 12. As a result, the faces of the human subjects are darkened, and the two human subjects are not displayed with appropriate brightness.

The exemplary embodiment of the present invention is described above in detail with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-016010 filed in the Japan Patent Office on 27 Jan. 2009, the entire content of which is hereby incorporated by reference.

What is claimed is:

1. An imaging device imaging a scene for control of exposure based on color detection comprising:
   a hue value setting portion that sets, for detection, at least one hue value from among a plurality of hue values;
   a color component region detection portion that detects a region of the scene, having a color component that includes the set hue value set by the hue value setting portion, from image data of the scene; and
   a color component region display portion that, based on the image data of the scene, converts the detected region having the color component to a first color, converts all remaining regions of the scene having any other color component to a second color different from the first color, and displays the entire scene on a display portion in only the first color and the second color wherein control of exposure is based upon color detection of the detected region.

2. The imaging device according to claim 1, wherein the color component that includes the set hue value is a group of colors within a predetermined range centered on the hue value.

3. The imaging device according to claim 2, further comprising:
   an operation portion from which a user inputs the predetermined range,
   wherein
   the hue value setting portion detects, from the image data of the scene, a region having a color component based on the predetermined range input from the operation portion.

4. The imaging device according to claim 1, wherein the hue value setting portion sets at least two hue values,
   the color component region detection portion detects, for each of the set hue values, the region having the color component that includes the set hue value, from the image data of the scene, and
   based on the image data of the scene, the color component region display portion converts a region having one of the detected plurality of color components to the first color, converts regions other than the region having one of the detected plurality of color components to the second color different from the first color, and displays the scene on the display portion.

5. The imaging device according to claim 1, wherein the hue value setting portion sets at least two hue values, the color component region detection portion detects, for each of the set hue values, the region having the color component that includes the set hue value, from the image data of the scene, and based on the image data of the scene, the color component region display portion converts a region that satisfies all of the detected plurality of color components to the first color, converts regions other than the region that satisfies all of the detected plurality of color components to the second color different from the first color, and displays the scene on the display portion.

6. The imaging device according to claim 1, further comprising:

an operation portion from which a user inputs a hue value, wherein the hue value setting portion sets the at least one hue value based on the hue value input from the operation portion.

7. The imaging device according to claim 1, wherein the first color is white and the second color is black.

8. An imaging method of imaging a scene for control of exposure based on color detection, comprising the steps of:

setting at least one hue value from among a plurality of hue values for detection;

detecting a region of the scene, having a color component that includes the set hue value, from image data of the scene; and based on the image data of the scene, converting the detected region having the color component to a first color, converting all remaining regions of the scene having any other color component to a second color different from the first color, and displaying the entire scene on a display portion in only the first color and the second color wherein control of exposure is based upon the color detection of the detected region.

9. The imaging method according to claim 8, wherein the first color is white and the second color is black.

* * * * *